US012269361B2

(12) United States Patent
Brandon et al.

(10) Patent No.: US 12,269,361 B2
(45) Date of Patent: Apr. 8, 2025

(54) SYSTEM AND METHOD TO DYNAMICALLY SUPPRESS NOISE AT ELECTRIC VEHICLE CHARGING SITES

(71) Applicant: GM Cruise Holdings LLC, San Francisco, CA (US)

(72) Inventors: Jeffrey Brandon, Phoenix, AZ (US); Darren Hau, Menlo Park, CA (US); Samuel Harrison Glidden, Phoenix, AZ (US); Michael Frank Schmidt, Scottsdale, AZ (US)

(73) Assignee: GM Cruise Holdings LLC, San Francisco, CA (US)

( * ) Notice: Subject to any disclaimer, the term of this patent is extended or adjusted under 35 U.S.C. 154(b) by 761 days.

(21) Appl. No.: 17/539,129

(22) Filed: Nov. 30, 2021

(65) Prior Publication Data

US 2023/0166621 A1 Jun. 1, 2023

(51) Int. Cl.
*H02J 7/00* (2006.01)
*B60L 53/30* (2019.01)
*B60L 53/62* (2019.01)
*B60L 53/67* (2019.01)
*B60L 53/68* (2019.01)
*B60L 58/24* (2019.01)
*B60L 53/14* (2019.01)

(52) U.S. Cl.
CPC ............... *B60L 53/62* (2019.02); *B60L 53/30* (2019.02); *B60L 53/67* (2019.02); *B60L 53/68* (2019.02); *B60L 58/24* (2019.02); *B60L 53/14* (2019.02); *B60L 2270/142* (2013.01); *B60L 2270/147* (2013.01); *Y02T 90/12* (2013.01)

(58) Field of Classification Search
CPC .......... B60L 53/62; B60L 53/30; B60L 53/67; B60L 53/68; B60L 53/14; B60L 58/24; B60L 2270/142; B60L 2270/147; Y02T 90/12
USPC ......................................................... 320/109
See application file for complete search history.

(56) References Cited

U.S. PATENT DOCUMENTS 9,379,575 B2  6/2016  Higashi
2022/0074750 A1*  3/2022  Ludwick ................. B60L 58/12

\* cited by examiner

*Primary Examiner* — Zixuan Zhou

(57) ABSTRACT

Systems and methods for dynamically suppressing noise at electric vehicle charging sites. In particular, systems and methods are provided for measuring the ambient noise at a charging site and adjusting electric vehicle chargers to reduce noise pollution. In some examples, electric vehicle charger cooling fans potentially generate a high level of noise, and the power output of a charger can be decreased to decrease the heat generated by the chargers, thereby reducing the need for fans. In various examples, reduction of noise pollution can be especially important in specified geographies (e.g., residential neighborhoods) and/or during selected timeframes (e.g., overnight). In various examples, the system interfaces with a central computer service (e.g., a dispatch service) to intelligently route autonomous vehicles to charging sites based on noise levels at various available charging sites.

20 Claims, 8 Drawing Sheets

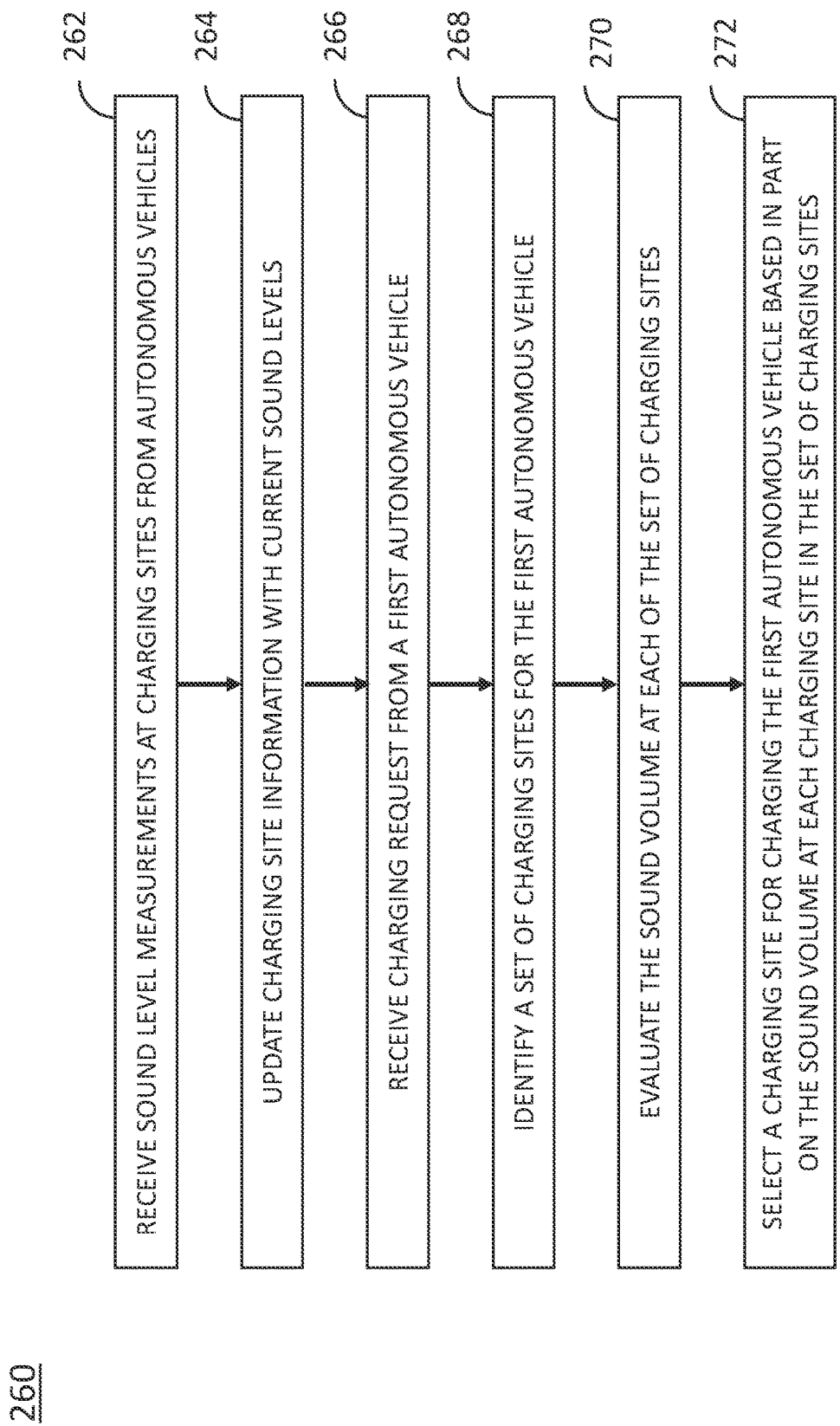

SYSTEM AND METHOD TO DYNAMICALLY SUPPRESS NOISE AT ELECTRIC VEHICLE CHARGING SITES

TECHNICAL FIELD

The present disclosure relates generally to vehicles implementing batteries and, more specifically, to devices and methods for suppressing noise at electric vehicle charging sites.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles are generally battery powered electric vehicles. Electric vehicles have integrated batteries for starting and powering the vehicles. The electric vehicle batteries need to be recharged periodically so that the vehicle can continue to run. As more electric vehicles, including electric cars, have been developed, the number of electric vehicle charging sites has increased. The sites can be located in commercial and/or residential zones. Additionally, there has been an increase in electric vehicle charging sites offering fast charging capabilities.

SUMMARY

Systems and methods are provided for dynamically monitoring and suppressing noise at electric vehicle (EV) charging sites. In particular, systems and methods are provided for measuring the ambient noise at a charging site and adjusting electric vehicle chargers to reduce noise pollution. In some examples, electric vehicle charger cooling fans potentially generate a high level of noise, and the power output of a charger can be decreased to decrease the heat generated by the chargers, thereby reducing the need for fans. In various examples, reduction of noise pollution can be especially important in specified geographies (e.g., residential neighborhoods) and/or during selected timeframes (e.g., overnight). In various examples, the system interfaces with a central computer service (e.g., a dispatch service) to intelligently route autonomous vehicles to charging sites based on noise levels at various available charging sites.

According to one aspect, a method for monitoring noise at an electric vehicle charging site, comprises: detecting sound from a plurality of chargers at the electric vehicle charging site at an autonomous vehicle microphone; determining a sound level of the sound from the plurality of chargers; comparing the sound level to a threshold; and when the sound level approaches the threshold, adjusting charger settings for at least one of the plurality of chargers.

In some implementations, the method further comprises coupling an autonomous vehicle to a first charger of a plurality of chargers, wherein the autonomous vehicle includes the autonomous vehicle microphone. In some implementations, the method further comprises detecting a temperature at the first charging using infrared sensors on the autonomous vehicle. In some implementations, adjusting charger settings includes adjusting charger settings to decrease charging rate of the first charger thereby decreasing the temperature at the first charger. In some implementations, adjusting charger settings includes decreasing a fan speed of the first charger, thereby decreasing a first charger sound level. In some implementations, adjusting charger settings includes adjusting charger settings to decrease the sound level.

In some implementations, the method further comprises communicating the sound level with a central computer configured to route autonomous vehicles for charging. In some implementations, the method further comprises when the sound level approaches the threshold, routing autonomous vehicles to a different electric vehicle charging site.

According to another aspect, a system for monitoring noise at an electric vehicle charging site, comprises: an autonomous vehicle including a microphone configured to detect sound from a plurality of chargers at the electric vehicle charging site; and a central computer configured to: determine a sound level of the sound from the plurality of chargers; compare the sound level to a threshold; and when the sound level approaches the threshold, adjust charger settings for at least one of the plurality of chargers.

In some implementations, the first autonomous vehicle is coupled to a first charger of the plurality of chargers, and wherein the microphone is further configured to detect first charger sound. In some implementations, the autonomous vehicle further includes an infrared sensor configured to detect a first charger temperature. In some implementations, the central computer is configured to adjust charger settings for the first charger based on the temperature at the first charger. In some implementations, the central computer is configured to adjust charger settings for the first charger to decrease charging rate of the first charger thereby decreasing the temperature at the first charger. In some implementations, the central computer is configured to determine a first charger sound level and adjust charger settings for the first charger to decrease a fan speed of the first charger, thereby decreasing the first charger sound level. In some implementations, the central computer is configured to adjust charger settings to decrease the sound level.

In some implementations, the autonomous vehicle is a first autonomous vehicle, and wherein the central computer is configured to route other fleet autonomous vehicles for charging, based at least in part on the sound level. In some implementations, when the sound level approaches the threshold, the central computer is configured to route other fleet autonomous vehicles to a different electric vehicle charging site.

According to another aspect, a system for monitoring noise at an electric vehicle charging site, comprises: an autonomous vehicle including a microphone configured to: detect sound from a plurality of chargers at the electric vehicle charging site; and determine a sound level of the sound from the plurality of chargers; a first charger of the plurality of chargers, coupled to the autonomous vehicle, and configured to: receive the sound level from the autonomous vehicle; compare the sound level to a threshold; and when the sound level approaches the threshold, adjust settings to decrease the sound level.

In some implementations, when the sound level approaches the threshold, the first charger is further configured to decrease first charger charging rate thereby decreasing first charger temperature and decreasing first charger fan duty cycle. In some implementations, the autonomous vehicle is a first autonomous vehicle, and further comprises a central computer configured to receive the sound level from the first autonomous vehicle and route other fleet autonomous vehicles for charging based at least in part on the sound level.

In some implementations, the first autonomous vehicle is further configured to detect first charger sound and determine first charger sound level. In some implementations, the central computer is configured to determine a first charger sound level and adjust first charger settings based on the first charger sound level. In some implementations, the threshold is based in part on noise levels at other charging sites. In some implementations, the central computer is configured to determine a plurality of sound levels at different areas within the charging site and identify a parking spot and corresponding charger at the charging site for a next autonomous vehicle based on the plurality of sound levels.

BRIEF DESCRIPTION OF THE DRAWINGS

The following figures are provided with accompanying description to provide some examples for the understanding of the subject matter disclosed herein. A component may be labeled with a same reference numeral throughout the drawings to indicate that the component is the same component or includes the same features with other components labeled with the same reference numeral throughout the drawings where the same reference numeral is utilized.

FIGS. 2A-2C are flow charts of methods for dynamically suppressing noise at autonomous vehicle charging sites, according to some embodiments of the disclosure;

DETAILED DESCRIPTION

Overview

Figure 1:
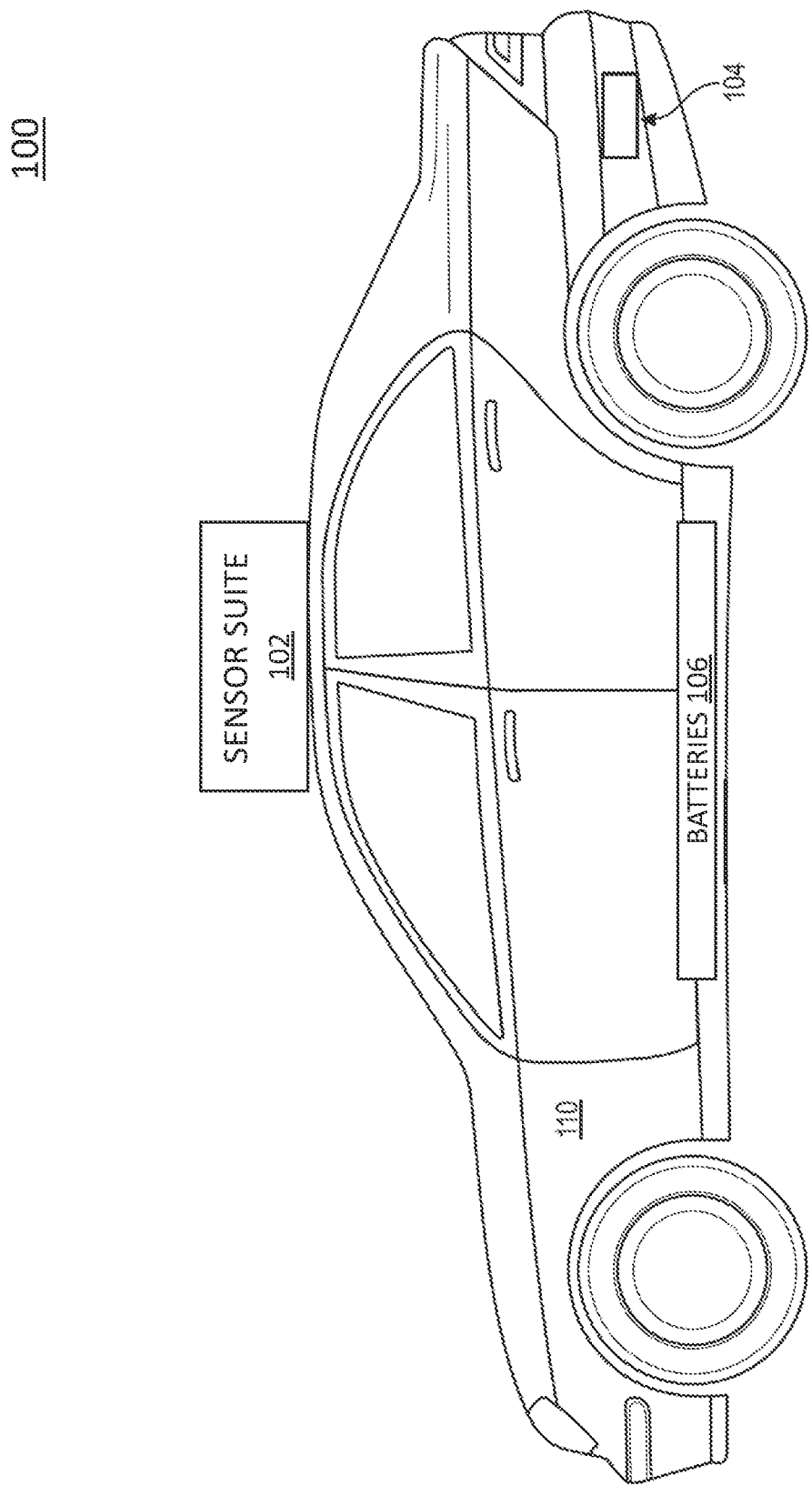
FIG. 1 is a diagram illustrating an autonomous vehicle, according to some embodiments of the disclosure.

Systems and methods are provided for dynamically monitoring and suppressing noise at electric vehicle (EV) charging sites. In particular, systems and methods are provided for measuring the ambient noise at a charging site and adjusting electric vehicle chargers to reduce noise pollution. In some examples, electric vehicle charger cooling fans potentially generate a high level of noise, and the power output of a charger can be decreased to decrease the heat generated by the chargers, thereby reducing the need for fans. In various examples, reduction of noise pollution can be especially important in specified geographies (e.g., residential neighborhoods) and/or during selected timeframes (e.g., overnight). In various examples, the system interfaces with a central computer service (e.g., a dispatch service) to intelligently route autonomous vehicles to charging sites based on noise levels at various available charging sites.

To keep a fleet of autonomous vehicles operating in an urban area, individual autonomous vehicles will frequently be recharged within the urban area using DC fast chargers. DC fast chargers have high power rates (e.g., 50 kW+) and generate heat that is removed via cooling fans. The cooling fans generate noise, which can be quite loud. Additionally, autonomous vehicles often include a cooling system to cool charging batteries. These noise sources can result in EV charging sites being quite noisy, especially when a charging site includes multiple EV chargers.

The urban areas in which autonomous vehicle fleets are operating tend to be high population centers. Thus, a significant number of EV charging sites are near residential or commercial areas, where noise pollution is a concern. Additionally, some municipalities have noise ordinances that limit the total sound level at a charging site, effectively limiting the number of chargers that can operate at full charging power simultaneously. The ability to manage noise at EV charging sites increases the availability of potential charging sites as well as the operational flexibility of charging sites.

Systems and methods are provided to utilize a processor at an EV charger coupled to local microphones to measure noise levels at an EV charging site. In some examples, local microphones are located in charging autonomous vehicles, and the microphones are used to measure noise levels originating from the EV charger heat exchanger cooling fans and/or autonomous vehicle HVAC fans. The detected noise levels in conjunction with measured EV charger heat exchanger temperatures can be used to modify the specific fan and duty cycle to ensure that sound emissions to the surrounding area are minimized while maintaining sufficient cooling of the EV charger heat exchanger. In some examples, when the fan generated sound emissions exceed a centrally-programmed noise level limitation due to excess demand from the heat exchangers, the charging power can be reduced to decrease heat generation and maintain sufficient cooling of the heat exchanger. In some examples, when the fan generated sound emissions approach a centrally-programmed noise level limitation, a central computer system (e.g., dispatch, or a routing coordinator) routes autonomous vehicles for charging to different EV charging sites.

Example Autonomous Vehicle Configured for EV Site Charging

FIG. 1 is a diagram 100 illustrating an autonomous vehicle 110, according to some embodiments of the disclosure. The autonomous vehicle 110 includes a sensor suite 102, an onboard computer 104, and batteries 106. In various implementations, the autonomous vehicle 110 uses sensor information from the sensor suite 102 to determine its location, to navigate traffic, and to sense and avoid obstacles. According to various implementations, the autonomous vehicle 110 is part of a fleet of vehicles for picking up passengers and/or packages and driving to selected destinations. The batteries 106 in the autonomous vehicle 110 can be periodically recharged at an electric vehicle charging site.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, infrared sensors, thermocouples, strain gauges, pressure monitors, barometers, thermometers, altimeters, wheel speed sensors, and a computer vision system. The sensor suite 102 continuously monitors the autonomous vehicle's environment. In some examples, sensor suite 102 microphones are used to monitor the sound level at a charger or at a charging lot. In some examples, sensor suite 102 infrared sensors and/or thermocouples are used to monitor the temperature of a charger. In some examples, infrared sensors and/or thermocouples are used to map temperature across a charger, with some localized areas of the charger having a different temperature than other areas.

In some examples, sensor suite 102 data is used to detect selected events, and update a high fidelity map. In particular, data from the sensor suite can be used to update a map with information used to develop layers. For example, microphones in the sensor suite 102 can be used to determine the sound level at an electric vehicle charger and/or at an electric vehicle charging lot, and update a map with current volume levels. In this way, sensor suite 102 data from many autonomous vehicles can continually provide feedback to the mapping system and the high fidelity map can be updated as more and more information is gathered.

The sensor suite 102 includes a plurality of sensors, and is coupled to the onboard computer 104, and the batteries 106. In some examples, the onboard computer 104 receives data captured by the sensor suite 102 and utilizes the data received from the sensor suite 102 in controlling operation of the autonomous vehicle 110. In some examples, one or more sensors in the sensor suite 102 are coupled to the batteries 106, and capture information regarding a state of charge of the batteries 106 and/or a state of health of the batteries 106. This information can be used to determine when the autonomous vehicle 110 batteries 106 will next need charging.

The batteries 106 may include multiple batteries and/or battery cells. The batteries and/or battery cells may be coupled together. In some examples, the batteries 106 include a high voltage (HV) battery and one or more low voltage (LV) batteries. In some instances, the one or more LV batteries are 12V batteries. The batteries 106 are used for operation of the autonomous vehicle, for example to power the vehicle and to start the vehicle. In some implementations, the autonomous vehicle is an electric vehicle, and the batteries 106 provide power for movement of the vehicle among other operations of the vehicle. Furthermore, the batteries 106 power components of the autonomous vehicle including the sensor suite 102 and the onboard computer 104.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. Based upon the vehicle state and programmed instructions, the onboard computer 104 controls and/or modifies driving behavior of the autonomous vehicle 110.

In some implementations, the onboard computer 104 receives indications of the state of charge and/or state of health of the batteries 106 and determines operations to be performed by the autonomous vehicle 110 based on the state of the batteries 106. For example, the onboard computer 110 may determine the level of charge of the batteries 106, and the onboard computer 110 may determine that the batteries 106 need to be charged. In some implementations, based on a determined state of charge and/or state of health of the batteries 106, the onboard computer 106 may perform operations to address a condition of the batteries 106, such as causing the vehicle 106 to proceed to a charger for charging the batteries 106 and causing charging of the batteries 106 to be stopped in response to determining the batteries 106 have been charged to a selected level of charge.

In some examples, vehicle sensors determine the temperature of charging batteries and, if the battery temperature reaches a selected threshold, the onboard computer 110 causes an autonomous vehicle HVAC system to turn on and cool down the batteries. In some examples, vehicle sensors determine the sound volume of the autonomous vehicle HVAC system, and the onboard computer 104 can adjust charging speed and HVAC volume to keep the sound volume below a selected threshold. In some examples, the onboard computer 106 detects an imminent dead battery event and initiates an automatic shut down of the autonomous vehicle. In various implementations, the computer 104 determines a state-of-charge of the batteries 106 based on a voltage of the batteries 106, a current drawn from the batteries 106, temperature of the batteries 106, other data related to the batteries 106, and/or a combination thereof.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Methods for Dynamically Suppressing Noise at a Charging Site

Figure 2A:
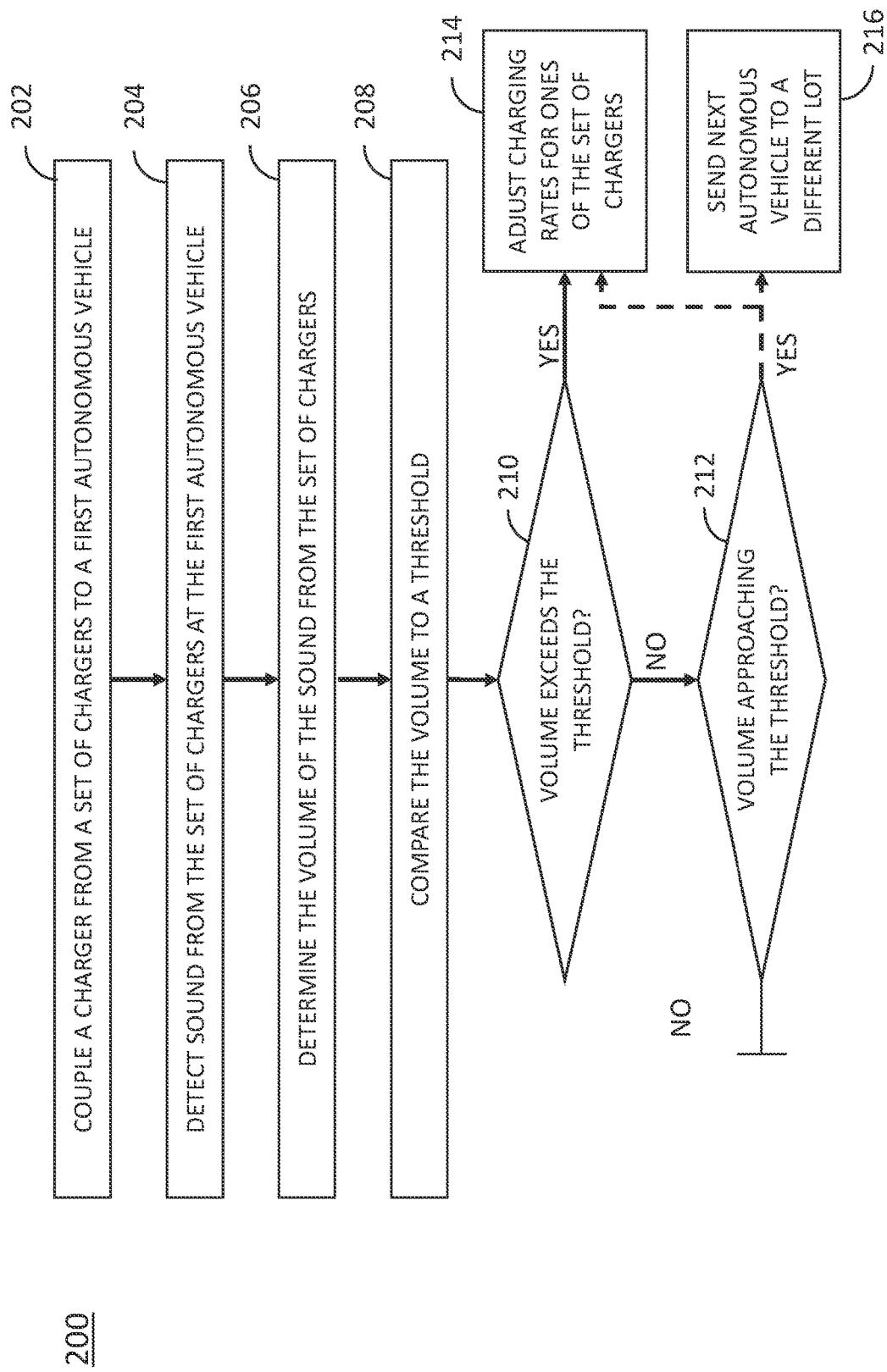

FIG. 2A is a flow chart of a method 200 for dynamically suppressing noise at an autonomous vehicle charging site, according to various embodiments of the invention. At step 202, a charger from a set of chargers at a charging site is coupled to a first autonomous vehicle. The first autonomous vehicle includes one or more microphones which, and, at step 204, the autonomous vehicle microphones detect sound at the charging site. In particular, the microphones detect sound from the charger and sound from the set of chargers at the charging site.

At step 206, the volume of the sound from the set of chargers is determined. In particular, the sound pressure level of the sound from the set of chargers is determined. In some examples, the volume of the sound from the charger coupled to the first autonomous vehicle is determined. In some examples, before the autonomous vehicle begins charging at step 202, the autonomous vehicle microphones measure an ambient sound level. The ambient sound level before charging begins can be used to determine an increase in the sound level from the charger coupled to the first autonomous vehicle. In some examples, ambient sound level is measured while the autonomous vehicle is on the street close to the charging site. In some examples, the change in ambient sound level as the autonomous vehicle nears the charging site is measured. Additionally, the ambient sound level at different locations within the charging site can be measured. Information about the ambient sound level at different locations within the charging site can be used to identify the source (or the location of the source) of various sounds.

In some examples, the directionality of sound is used to identify the source (or the location of the source) of various sounds. In particular, as an autonomous vehicle drives near and/or within a charging site, the direction(s) from which sound is detected at the autonomous vehicle relative to the location of the autonomous vehicle is used to identify the source of various sounds. An autonomous vehicle microphone and/or microphone array can be used to determine directionality, which can help identify the source of noise signals. In some examples, autonomous vehicles include technology to detect the directionality of emergency vehicle sirens such as ambulance sirens, firetruck sirens, and police car sirens, and this technology can be used to identify the location and/or source of sound at a charging site. In various examples, by identifying the location and/or source of sound in a charging lot, specific chargers that are creating the sound can be identified.

At step 206, the volume of the sound from the set of chargers is determined. In some examples, the overall volume of the sound at the first autonomous vehicle's location is measured. In some examples, the volume of the sound from the set of chargers is measured. In some examples, the volume of the sound from the charger coupled to the first autonomous vehicle is measured. At step 208, the volume is compared to a threshold. In various examples, the threshold may be a sound level threshold for the charging lot, and it may be a sound level threshold for a particular location within the charging site. For example, the threshold can be a threshold for sound level at a particular charger.

At step 210, it is determined whether the volume exceeds the threshold. In some examples, the first autonomous vehicle determines whether the volume exceeds the threshold. In some examples, the volume measurement is transmitted to a central computer and the central computer determines whether the volume exceeds the threshold. In some examples, the volume is transmitted to a charger of the set of chargers and the charger determines whether the volume exceeds the threshold. In various examples, the threshold can vary depending on the particular charging site and on the time of day. For example, the noise level threshold in a residential neighborhood may be lower at night when residents are trying to sleep.

At step 210, if the volume exceeds the threshold, at step 214, the charging rates for one or more of the chargers in the set of chargers is adjusted to decrease the volume. In particular, when charging rate is decreased, the amount of heat generated by charging is decreased, and the cooling fan speeds can be lowered. Since the cooling fan noise is the main component of the generated sound, decreasing cooling fan speed decreases the overall sound level. Additionally, autonomous vehicles batteries that are being charged generate heat that is cooled by an autonomous vehicle HVAC system, which generates noise. Decreasing the charging rate decreases the heat generated by the autonomous vehicle batteries, similarly allowing the autonomous vehicle HVAC system to slow down, decreasing the sound level.

At step 210, if the volume does not exceed the threshold, the method 200 proceeds to step 212, and it is determined whether the volume is approaching the threshold. In particular, if the measured volume is a selected percentage of the total volume threshold, the volume may be considered to be approaching the threshold. In one example, if the volume is 80% of the threshold volume, the volume is considered to be approaching the threshold. In some examples, if the volume is approaching the threshold at step 212, the method proceeds to step 216 and the next autonomous vehicle is routed to a different lot. Additionally, in some examples, if the volume is approaching the threshold at step 212, the method may proceed to step 214 and charging rates for one or more of the chargers in the set of chargers is adjusted to decrease the volume. In particular, in some examples, at step 214, the charging rates may be adjusted to decrease the volume and allow for an additional autonomous vehicle to be charged at the charging site. If the volume is not approaching the threshold at step 212, the method 200 ends.

In some examples, the volume determined at step 206 is saved to a central computing system database and/or map. The central computing system can then use recent volume information in determining where to route future autonomous vehicles in the fleet for charging. Additionally, historical volume information can be associated with corresponding information regarding the number of vehicles being charged, the locations of the chargers in use within the charging site, and the charging rates of the various chargers to predict volume levels at various charging sites in the future. In some examples, noise emissions are controlled on premises using location-specific microphone feedback to maximize charging power while meeting noise constraints.

Figure 2B:
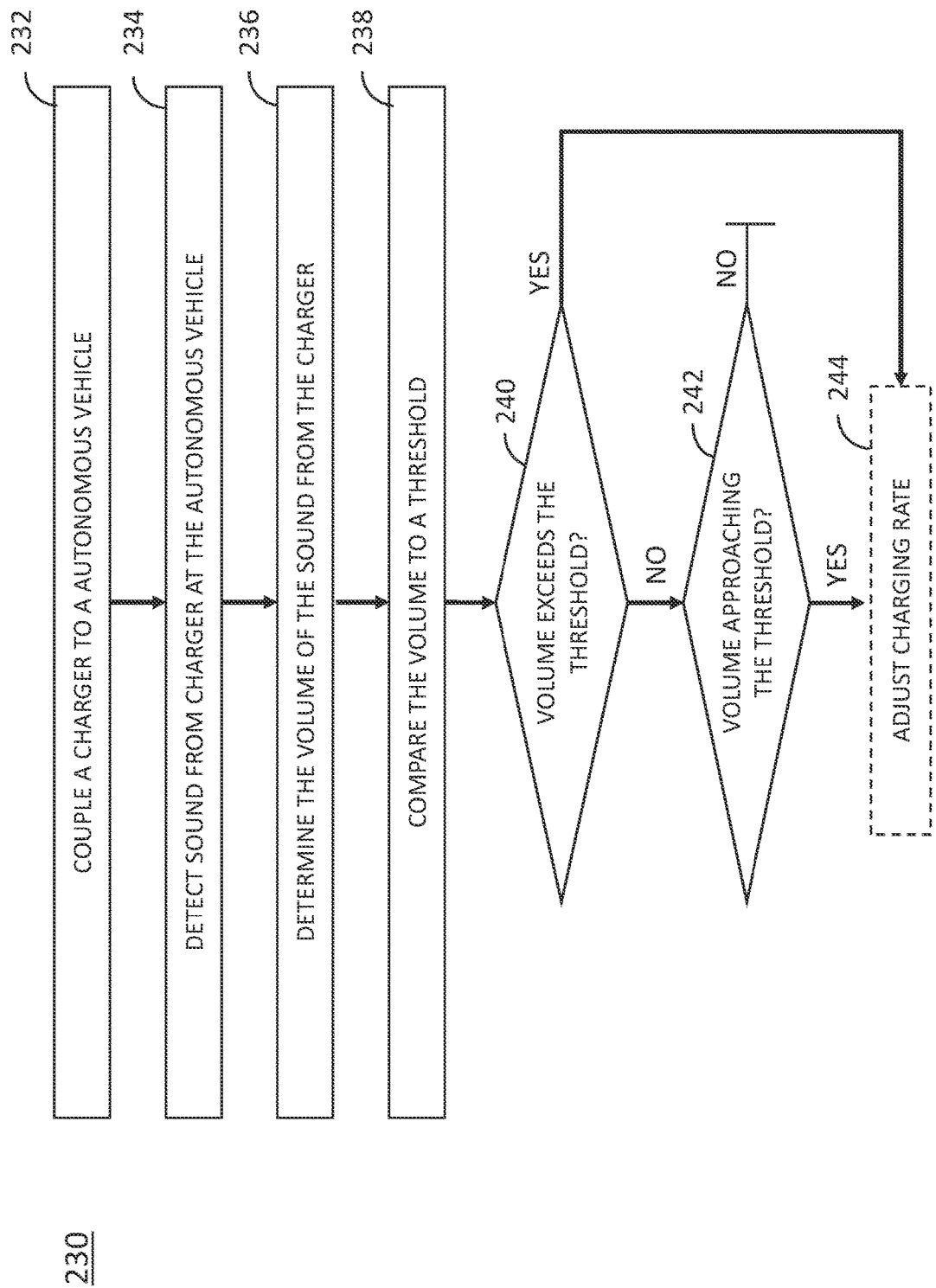

FIG. 2B is a flow chart of a method 230 for dynamically suppressing noise at an autonomous vehicle charger, according to various embodiments of the invention. In particular, the method 230 is a method for suppressing noise of a single charger and corresponding autonomous vehicle that is using the charger. At step 232, the charger is coupled to an autonomous vehicle. At step 234, sound from the charger is detected by the autonomous vehicle. At step 235, the autonomous vehicle determines the volume of the sound from the charger. In other examples, the charger itself can include a microphone for measuring sound volume. In some examples, the first autonomous vehicle sends the microphone data to a cloud and/or central computer that determines the sound volume.

At step 238, the volume is compared to a threshold. In some examples, the autonomous vehicle onboard computer has threshold information for the charger and compares the volume to the threshold. In some examples, the measured volume is transmitted to a central computer and the central computer compares the volume measured by the autonomous vehicle with a volume threshold for the charger. In various examples, the noise threshold for the charger can vary depending on the time of day, the day of the week, and/or other parameters.

At step 240, it is determined whether the measured volume exceeds a threshold. This can be determined at the autonomous vehicle, at the electric vehicle charger, or at a central computing system. If the volume exceeds a threshold, the method proceeds to step 244 and the charging rate for the autonomous vehicle is adjusted. As explained above with respect to FIG. 2A, decreasing the charging rate decreases the heat generated by the charger, and as the heat decreases, the cooling fan speed can be decreased, lowering the volume of the charger. Similarly, as the charging rate decreases, the heat generated by the charging autonomous vehicle battery decreases, and the autonomous vehicle HVAC cooling system speed can decrease, lowering the volume of the autonomous vehicle HVAC system.

At step 240, if the measured volume does not exceed a threshold, the method 230 proceeds to step 242 and determines if the volume is approaching the threshold. If the volume is approaching the threshold, the method proceeds to step 244 and the charging rate is adjusted. If the volume is not approaching the threshold, the method 232 ends. In some examples, the method 230 is periodically repeated to monitor the sound level at the charger.

FIG. 2C is a flow chart of a method 260 for a dispatch system to determine where to charge autonomous vehicles in an autonomous vehicle fleet based on charging site noise levels, according to various embodiments of the invention. At step 262, sound level measurements at one or more charging sites are received at a central computer. The sound level measurements can be performed by autonomous vehicles in an autonomous vehicle fleet. At step 264, the central computer updates charging site information for the one or more charging sites with the received sound level measurements. In some examples, the central computer has a database with charging site information, and the database is updated to include received sound level measurements at specific time points. In some examples, charging site sound level measurements at various specific locations are included in a mapping system.

At step 266, the central computer receives a charging request from a first autonomous vehicle in the fleet. In some examples, the first autonomous vehicle notifies the central computer that its battery needs charging. In some examples, the central computer periodically monitors the battery level of autonomous vehicles in the fleet and the central computer determines that the first autonomous vehicle battery needs charging.

At step 268, the central computer identifies a set of potential charging sites for the first autonomous vehicle. In particular, from a database including the charging sites in the operational city, the central computer may identify a subset of charging sites that are within a certain distance of the location of the first autonomous vehicle, such that the first autonomous vehicle does not travel a long distance for charging. The central computer may also identify charging sites with available chargers for the subset. In various examples, the central computer can use any selected variables to define a subset of charging sites for charging the first autonomous vehicle.

At step 270, the central computer evaluates a sound level measurement from each of the subset of charging sites. In some examples, the central computer evaluates sound level measurements stored in the charging site database. In some examples, the central computer requests current sound level measurements from other autonomous vehicles in the fleet that are at one of the charging sites in the subset of charging sites. In some examples, the central computer evaluates the sound level measurements to determine whether a charging site sound level is approaching (or exceeding) a threshold.

At step 272, the central computer selects a charging site for the first autonomous vehicle based in part on the sound volume at each charging site in the subset of charging sites. For example, the central computer may select the charging site with the lowest sound volume measurement. In some examples, the central computer may select the charging site with a sound volume measurement that is furthest from the threshold for the particular charging site. In some examples, the central computer considers other autonomous vehicles that need charging in determining where to send the first autonomous vehicle for charging.

Example System for Dynamically Suppressing Noise at a Charging Site

Figure 3:
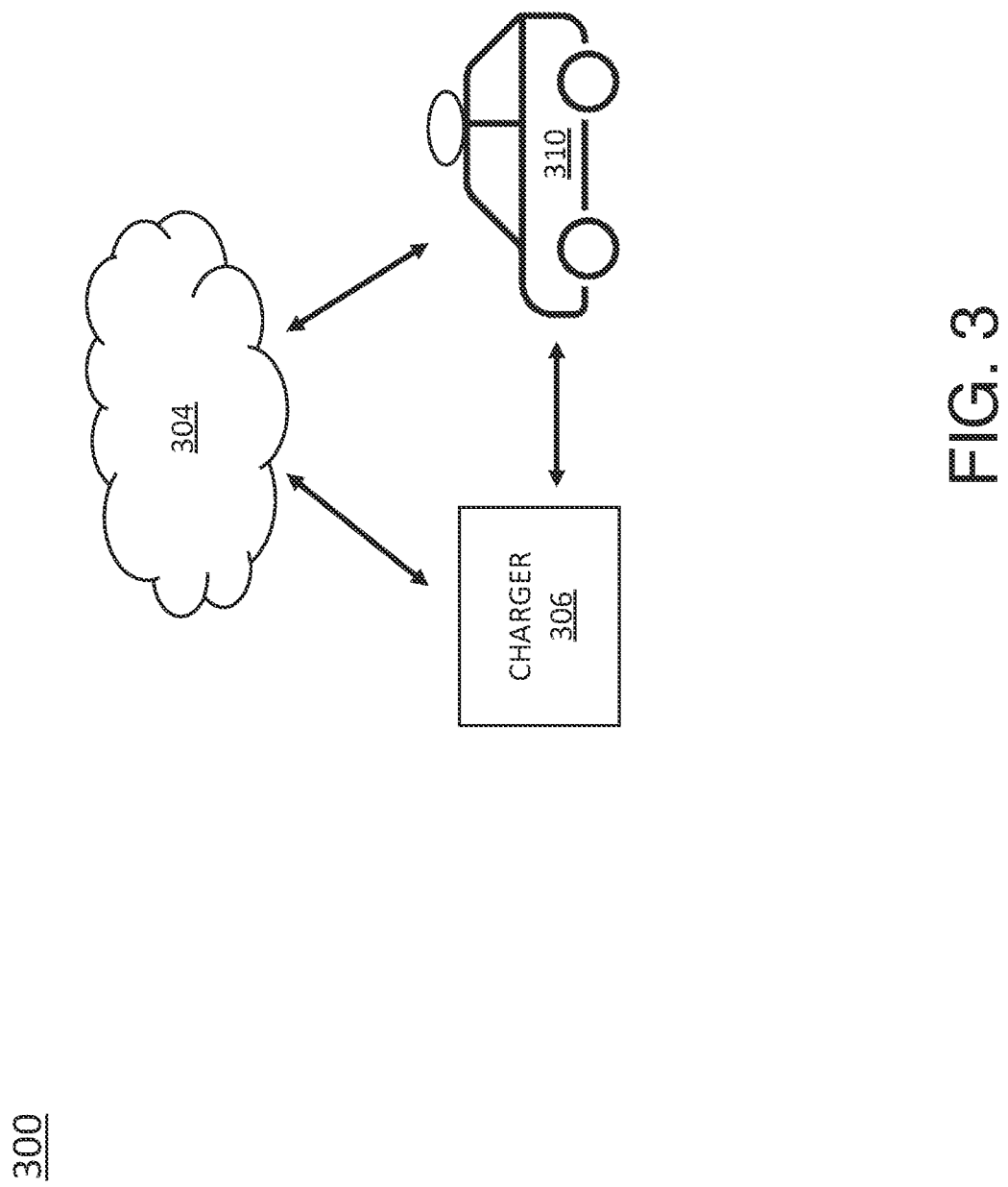
FIG. 3 is a block diagram illustrating a system for detecting and dynamically suppressing noise at an autonomous vehicle charging site, according to some embodiments of the disclosure.

FIG. 3 is a block diagram illustrating a system 300 for detecting and dynamically suppressing noise at an autonomous vehicle charging site, according to various embodiments of the invention. The system 300 includes a cloud 304, a charger 306, and an autonomous vehicle 310. The system 300 can be used for the methods 200, 230, 260, of FIGS. 2A, 2B, 2C. In various examples, the autonomous vehicle 310 includes microphones. The autonomous vehicle microphones communicate sound to a cloud-based processor in the cloud 304, and the cloud-based processor determines the sound level emitted from the electric vehicle charger 306. In some examples, the cloud-based processor is a central computer. In some examples, the sound emitted from the electric vehicle charger is emitted from the charger heat exchanger cooling fans.

According to some implementations, the autonomous vehicle 310 includes infrared sensors. The autonomous vehicle infrared sensors communicate thermal data to the cloud-based processor in the cloud 304, and the cloud-based processor monitors the temperature across the surface of the electric vehicle charger 306. In some examples, the temperature across the surface of the heat exchanger in electric vehicle charger 306 is monitored.

In some implementations, the cloud-based processor remotely controls the duty cycle of cooling fan(s) in the charger 306 based on feedback from autonomous vehicle infrared sensors as well as autonomous vehicle microphones. That is, the processor controls the duty cycle of the charger 306 cooling fan(s) based on the charger heat exchanger surface temperature (as detected by the autonomous vehicle infrared sensors) and the charger sound (as collected by the autonomous vehicle microphone(s)).

According to some examples, a centralized connection at a cloud-based processor or central computer allows dynamic modification of noise and temperature at the charger 306. As described with respect to FIGS. 2A-2C, the charging rate for the charger 306 can be modified to adjust temperature and sound level. If the charger 306 is too loud, and fan speed needs to be decreased to decrease the noise level, the charging rate can be decreased to decrease the charger 306 temperature, thereby decreasing the fan speed needed to cool the charger 306.

According to some implementations, the cloud-based processor is used to arbitrate maximum charging power using feedback from autonomous vehicle-measured noise emissions and temperature measurements. In particular, the autonomous vehicle-measured noise emissions and temperature measurements are compared to predetermined centrally-controlled temperature and sound limitations. The predetermined temperature and sound limitations can be limitations for a particular charger, and the predetermined temperature and sound limitations can be limitations for a charging site including multiple chargers. In some examples, the current charging power available at a particular charging site after taking into account temperature and sound limitations can be reported to a routing manager (i.e., central dispatch) for routing decisions.

In some implementations, the charger 306 includes multiple small fans arranged at various locations with respect to the charger heat exchanger, and the duty cycle of each of the multiple small fans can be dynamically modified to adjust sound levels. In some examples, the duty cycle of each of the multiple small fans can be dynamically modified by a processor at the charger 306, based on feedback from the autonomous vehicle infrared sensors. In some examples, the infrared sensors determine temperature at various locations on the charger 306 heat exchanger, and adjusts the duty cycle of various fans accordingly. In particular, fans directed at hotter areas of the heat exchanger will have a higher duty cycle and provide more cooling, while fans directed at less hot areas of the heat exchanger can have a lower duty cycle since less cooling is needed at the less hot areas. In some examples, the duty cycle of each of the multiple small fans is dynamically modified to ensure only necessary cooling fan locations are operating, thus minimizing noise emissions and parasitic energy loss. In some examples, mufflers and baffles are added to the charger 306 to decrease noise emission. In some examples, the charger 306 includes an active muffler system that trades off cooling efficiency with noise emissions in different directions.

According to some implementations, noise at the charger 306 can be measured and dynamically suppressed on premises at the charging site without communicating with the cloud 304. In particular, a central processor for a charger can be mounted to the charger 306. The autonomous vehicle microphones communicate sound to the charger central processor, and the processor determines the sound level emitted from the electric vehicle charger 306. In various examples, the autonomous vehicle microphones communicate with the charger 306 processor via WiFi, LTE, Bluetooth, or another wireless communication system.

In to some implementations, the autonomous vehicle 310 includes infrared sensors, which communicate thermal data to the charging site 306 processor, and the charging site 306 processor monitors the temperature across the surface of the electric vehicle charger 306. In some examples, the autonomous vehicle 310 includes mounted thermocouples for measuring temperature. In some examples, the charger 306 processor remotely controls the duty cycle of cooling fan(s) in the charger 306 based on feedback from autonomous vehicle infrared sensors as well as autonomous vehicle microphones. As explained above with respect to the cloud-based processor, the charger 306 processor controls the duty cycle of the charger 306 cooling fan(s) based on the charger heat exchanger surface temperature (as detected by the autonomous vehicle infrared sensors) and the charger sound (as collected by the autonomous vehicle microphone(s)). According to some examples, the connection between the autonomous vehicle and the charger 306 processor allows for dynamic modification of noise and temperature at the charger 306. While in some examples, the processor is located at the charger 306, in some examples, the processor is positioned near the charger 306 in the charging lot within which the charger 306 is located. In some examples, the processor communicates with multiple chargers in the charging lot.

According to some implementations, noise at the charger 306 can be measured and dynamically suppressed on premises at the charging site using sensors located at the charger 306 as well as a charger 306 processor. In some examples, the charger 306 includes sensors for noise detection and a processor for determining the sound level emitted from the electric vehicle charger 306. The charger 306 microphones communicate sound to the charger 306 processor, which arbitrates charging power based on noise and temperature measurements and centrally-controlled temperature and sound limitations. In some examples, the charger 306 processor communicates total current site charging power as well as available current site charging power to a central computer, which can use the information for routing decisions.

According to some implementations, noise at the charger 306 can be detected at the charging site using sensors located at the charger 306, and the charger 306 sensor data is sent to a cloud-based processor for processing. The cloud 304-based processor can remotely process the communicated sound originating from the charger 306 microphones to determine the sound level emitting from the charger 306 heat exchanger cooling fans. In some examples, the cloud 304-based processor can remotely process the communicated thermal originating from the charger 306 thermocouple and/or infrared sensors to determine temperature at various points across the surface of the charger 306 heat exchanger. In various examples, the cloud 304-based processor can be used to remotely control the duty cycle of various cooling fan(s) based on feedback from the charger 306 thermocouple and/or infrared sensors as well as detected sound collected by the microphone. The centralized connection can allow dynamic modification of noise and temperature limitations. The cloud 304-based processor can be used to arbitrate maximum charging power based on feedback from charger 306 noise emissions and temperature measurements. In particular, sound level and temperature measurements are compared to predetermined centrally-controlled sounds and temperature limitations. In some examples, current charger and/or charging site charging power can be reported to a central computer and used by a routing coordinator for routing decisions.

Figure 4:
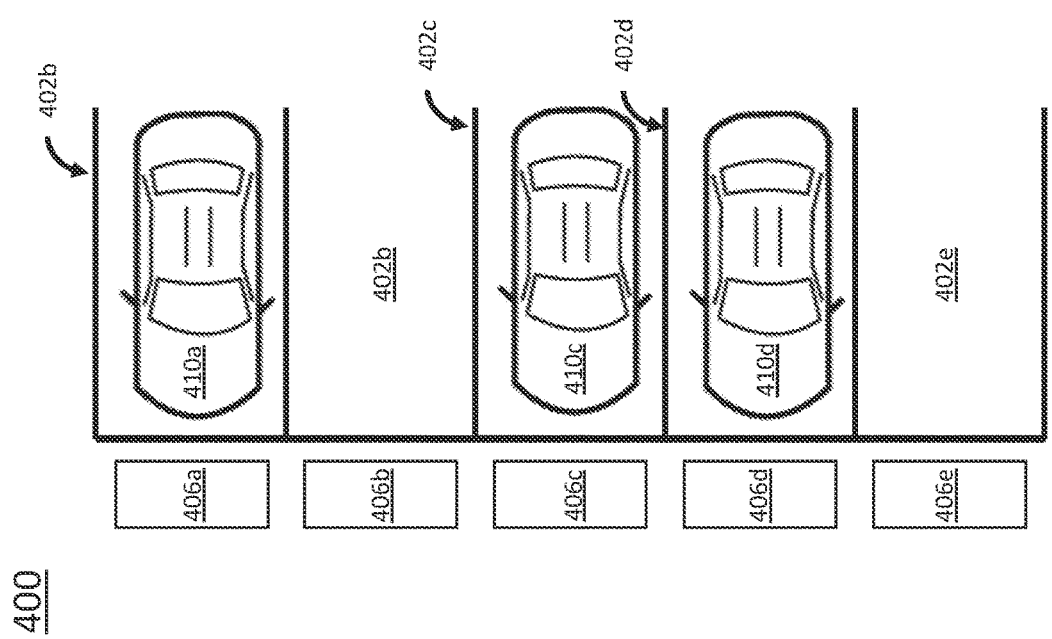
FIG. 4 is a diagram illustrating an electric vehicle charging site configured for detecting and dynamically suppressing noise levels, according to some embodiments of the disclosure.

FIG. 4 is a diagram illustrating an electric vehicle charging site 400 configured for detecting and dynamically suppressing noise levels, according to various embodiments of the invention. The charging site 400 includes ten parking spaces 402a-402j, each having a respective charger 406a-406j. The example of FIG. 4 includes five autonomous vehicles 410a, 410c, 410d, 410g, 410j at the charging site 400, parked in five of the parking spaces 402a, 402c, 402d, 402g, 402j, charging at the respective chargers 406a, 406c, 406d, 406g, 406j.

In various examples, each of the autonomous vehicles 410a, 410c, 410d, 410g, 410j includes sensors to detect sound and/or temperature at the respective charger 406a, 406c, 406d, 406g, 406j. In some examples, the autonomous vehicles 410a, 410c, 410d, 410g, 410j include microphones that detect noise at the respective parking spaces 402a, 402c, 402d, 402g, 402j. As described above with respect to FIGS. 2A-2C, and FIG. 3, the autonomous vehicle 410a, 410c, 410d, 410g, 410j microphone data can be used either at a respective charger 406a, 406c, 406d, 406g, 406j or, via a cloud, at a central computer to determine the sound level at each respective charger 406a, 406c, 406d, 406g, 406j and/or parking space 402a, 402c, 402d, 402g, 402j. The sound level can be compared to a threshold or sound limitation to determine whether the sound level at any particular parking space 402a, 402c, 402d, 402g, 402j and/or at the charging site 400 is approaching or exceeds a threshold, and the noise emitted by the respective charger 406a, 406c, 406d, 406g, 406j can be dynamically adjusted accordingly In particular, noise emitted by a charger is decreased by decreasing the charging rate of the respective charger 406a, 406c, 406d, 406g, 406j thereby decreasing the heat generated by the charger 406a, 406c, 406d, 406g, 406j and decreasing the speed of the fan that is cooling the charger 406a, 406c, 406d, 406g, 406j.

Additionally, autonomous vehicle 410a, 410c, 410d, 410g, 410j microphone data can be used to determine the directionality of sound and to identify the source (or the location of the source) of various sounds. In particular, a microphone and/or microphone array at each autonomous vehicle 410a, 410c, 410d, 410g, 410j can be used to determine directionality, which can help identify the source of noise signals. In various examples, by identifying the location and/or source of sound in a charging lot, specific chargers that are creating the sound can be identified. Additionally, by identifying the location and/or source of sound in a charging lot, the sound level at individual chargers 406a-406j can be measured and compared to the sound level at other chargers 406a-406j. In some examples, information about the sounds level at various locations within the charging site can be used to select an optimal parking space for a next vehicle to minimize overall noise generation. In some examples, information about the sounds level at various locations within the charging site can be used to adjust the sound level generated at individual chargers 406a-406j.

As described above, autonomous vehicle 410a, 410c, 410d, 410g, 410j thermocouple sensors and/or infrared sensors can be used to monitor the temperature at the respective charger 406a, 406c, 406d, 406g, 406j. Since the majority of noise generated by each charger 406a, 406c, 406d, 406g, 406j is from cooling fans to cool down the heat exchanger, monitoring temperature informs the duty cycle of the respective cooling fans necessary to cool down the heat exchanger. The temperature of each respective chargers 406a, 406c, 406d, 406g, 406j can be decreased by decreasing the charging rate. Once the temperature is decreased, the cooling fan speed can be decreased to decrease noise levels.

In various implementations, by spreading out the autonomous vehicles 410a, 410c, 410d, 410g, 410j throughout the charging site 400, the noise at a particular location within the charging site 400 can be less than if the autonomous vehicles 410a, 410c, 410d, 410g, 410j were all parked on the same side (left, right, top, bottom) of the charging site 400. In various examples, the sound level at the charging site 400 can be determined using microphones from multiple autonomous vehicles 410a, 410c, 410d, 410g, 410j. Using AV microphones to measure noise levels allows for increased sound level accuracy across the charging site while vehicles are charging, thus also eliminating the need for a separate sound measurement system. In various examples, centralized control can be used to dynamically limit maximum sound emission, EV charger temperature, and charging power.

Furthermore, as discussed above, by monitoring the sound level at the charging site 400, the sound level of the site can be factored into decisions regarding future routing of vehicles for charging. In one example, when all ten parking spaces 402a-402j and chargers 406a-406j are in use, in order not to exceed sound limitations set by city ordinance, charging rates are reduced. Thus, when an autonomous vehicle needs a quick charge, it can be routed to a different lot. Similarly, in some examples, city ordinances may allow a high noise level during the day than at night, such that all ten chargers 406a-406j can be used at full charging rates during the day, but after a selected time, the noise level limitations result either a limited number of chargers 406a-406j being available for use and/or the maximum charging rate of each charger 406a-406j being reduced to reduce heat generated and decrease cooling fan speed and cooling fan noise.

Example of Autonomous Vehicle Fleet

Figure 5:
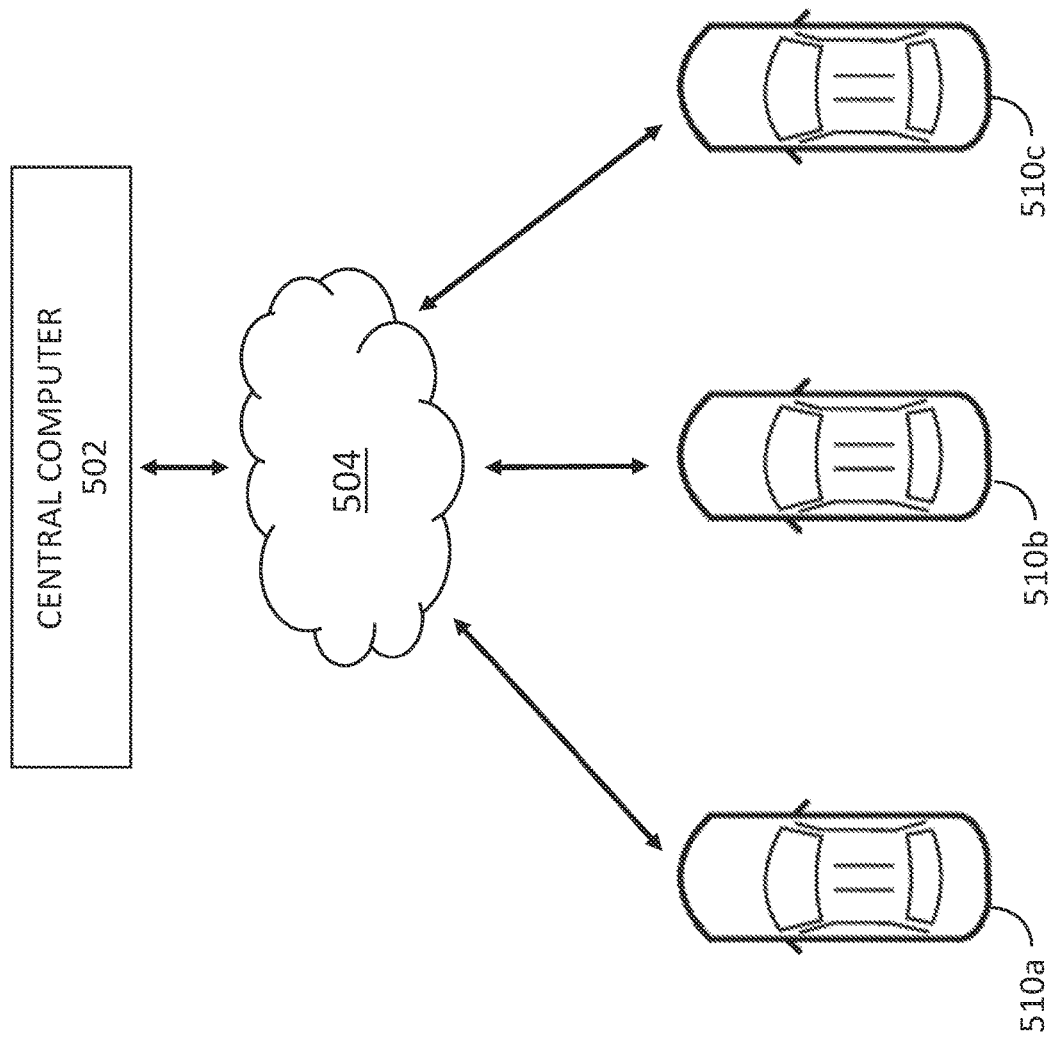
FIG. 5 is a diagram illustrating a fleet of autonomous vehicles in communication with a central computer, according to some embodiments of the disclosure.

FIG. 5 is a diagram 500 illustrating a fleet of autonomous vehicles 510a, 510b, 510c in communication with a central computer 502, according to some embodiments of the disclosure. The vehicles 510a-510c communicate wirelessly with a cloud 504 and a central computer 502. The central computer 502 includes a routing coordinator and a database of information from the vehicles 510a-510c in the fleet. Autonomous vehicle fleet routing refers to the routing of multiple vehicles in a fleet. The routing coordinator can coordinate charging of the autonomous vehicle fleet including the vehicles 510a-510c, determining which charging site to send an autonomous vehicle 510a-510c to for charging. In various examples, the central computer 502 receives data regarding the sound or noise level at various chargers and/or charging sites, and the routing coordinator uses noise and/or sound level data in determining where to route an autonomous vehicle 510a-510c for charging. The central computer also acts as a centralized ride management system and communicates with ridehail users via a ridehail service 506. Via the ridehail service 506, the central computer receives ride requests from various user ridehail applications. In some implementations, the autonomous vehicles 510a-510c communicate directly with each other.

When a charging request is received at a cloud 504, the request is sent to a routing coordinator at the central computer 502. As described above with respect to FIGS. 2A-2C, the central computer 502 can identify a set of potential charging sites (e.g., charging sites that are within a certain distance from the autonomous vehicle's location), and determine a current sound level at each charging site in the set. The routing coordinator can then use the sound level information to select a charging site and charger for the autonomous vehicle 510a-510c that requested charging.

As described above, each vehicle 510a-510c in the fleet of vehicles communicates with the routing coordinator. Thus, information gathered by various autonomous vehicles 510a-510c in the fleet can be saved and used to generate information for future routing determinations. For example, sensor data can be used to generate route determination parameters. Sensor data can include sound data at various charging sites. In some examples, an autonomous vehicle 510a-510c can measure a sound level at a charging site when the autonomous vehicle 510a-510c drives by the site. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals. In some examples, the routing coordinator uses collected position data corresponding to emergency events to generate a best route for an autonomous vehicle to avoid a potential emergency situation and associated unknowns.

According to various implementations, a set of parameters can be established that determine which metrics are considered (and to what extent) in determining routes or route modifications. For example, expected congestion or traffic based on a known event can be considered. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, safety of the route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints. In further examples, a set of parameters can be established that determine which metrics are considered (and to what extent) in selecting a charging site and charger for a particular autonomous vehicle.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charger), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridehailing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger). In some examples, charging speed can be prioritized over charging site noise reductions, while in other examples, charging site noise reduction can be prioritized.

The routing coordinator uses maps to select an autonomous vehicle from the fleet to fulfill a ride request. In some implementations, the routing coordinator sends the selected autonomous vehicle the route details, including charging site location and a specific charger location, and an onboard computer on the selected autonomous vehicle generates a route and navigates to the destination. In some implementations, the routing coordinator in the central computing system 402 generates a route for each selected autonomous vehicle 410a-410c, and the routing coordinator determines a route for the autonomous vehicle 410a-410c to travel from the autonomous vehicle's current location to a first destination, such as a charging site.

Example of a Computing System for Ride Requests

Figure 6:
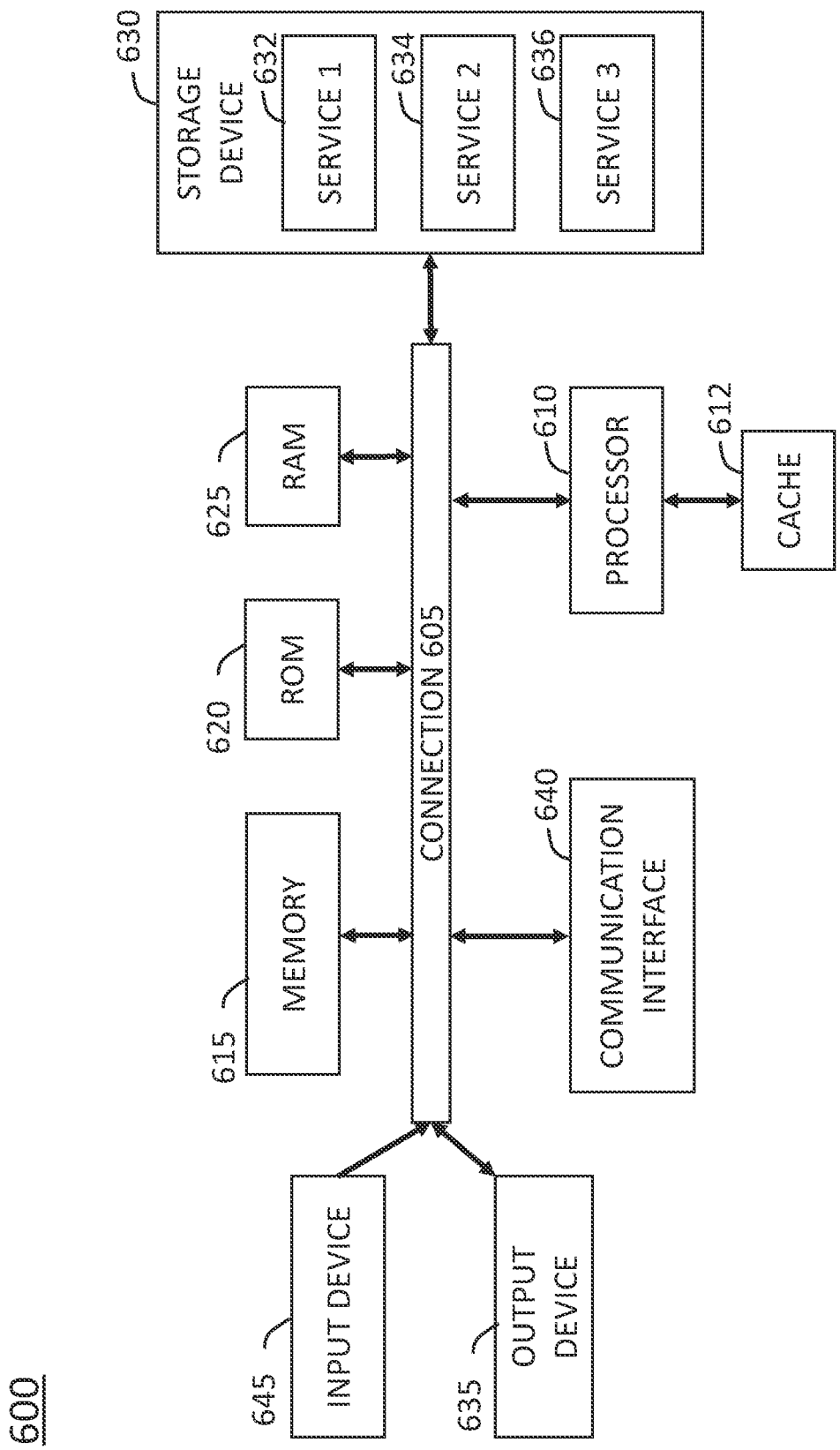
FIG. 6 shows an example embodiment of a system for implementing certain aspects of the present technology.

FIG. 6 shows an example embodiment of a computing system 600 for implementing certain aspects of the present technology. In various examples, the computing system 600 can be any computing device making up the onboard computer 104, the central computer 502, or any other computing system described herein. The computing system 600 can include any component of a computing system described herein which the components of the system are in communication with each other using connection 605. The connection 605 can be a physical connection via a bus, or a direct connection into processor 610, such as in a chipset architecture. The connection 605 can also be a virtual connection, networked connection, or logical connection.

In some implementations, the computing system 600 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 600 includes at least one processing unit (CPU or processor) 610 and a connection 605 that couples various system components including system memory 615, such as read-only memory (ROM) 620 and random access memory (RAM) 625 to processor 610. The computing system 600 can include a cache of high-speed memory 612 connected directly with, in close proximity to, or integrated as part of the processor 610.

The processor 610 can include any general-purpose processor and a hardware service or software service, such as services 632, 634, and 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction, the computing system 600 includes an input device 645, which can represent any number of input mechanisms, such as a microphone for speech, a touch-sensitive screen for gesture or graphical input, keyboard, mouse, motion input, speech, etc. The computing system 600 can also include an output device 635, which can be one or more of a number of output mechanisms known to those of skill in the art. In some instances, multimodal systems can enable a user to provide multiple types of input/output to communicate with the computing system 600. The computing system 600 can include a communications interface 640, which can generally govern and manage the user input and system output. There is no restriction on operating on any particular hardware arrangement, and therefore the basic features here may easily be substituted for improved hardware or firmware arrangements as they are developed.

A storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as a processor 610, a connection 605, an output device 635, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a method for monitoring noise at an electric vehicle charging site, comprising: detecting sound from a plurality of chargers at the electric vehicle charging site at an autonomous vehicle microphone; determining a sound level of the sound from the plurality of chargers; comparing the sound level to a threshold; and when the sound level approaches the threshold, adjusting charger settings for at least one of the plurality of chargers.

Example 2 provides a method according to one or more of the preceding and/or following examples, further comprising coupling an autonomous vehicle to a first charger of a plurality of chargers, wherein the autonomous vehicle includes the autonomous vehicle microphone.

Example 3 provides a method according to one or more of the preceding and/or following examples, further comprising detecting a temperature at the first charger using infrared sensors on the autonomous vehicle.

Example 4 provides a method according to one or more of the preceding and/or following examples, wherein adjusting charger settings includes adjusting charger settings to decrease charging rate of the first charger thereby decreasing the temperature at the first charger.

Example 5 provides a method according to one or more of the preceding and/or following examples, wherein adjusting charger settings includes decreasing a fan speed of the first charger, thereby decreasing a first charger sound level.

Example 6 provides a method according to one or more of the preceding and/or following examples, wherein adjusting charger settings includes adjusting charger settings to decrease the sound level.

Example 7 provides a method according to one or more of the preceding and/or following examples, further comprising communicating the sound level with a central computer configured to route autonomous vehicles for charging.

Example 8 provides a method according to one or more of the preceding and/or following examples, further comprising, when the sound level approaches the threshold, routing autonomous vehicles to a different electric vehicle charging site.

Example 9 provides a system for monitoring noise at an electric vehicle charging site, comprising: an autonomous vehicle including a microphone configured to detect sound from a plurality of chargers at the electric vehicle charging site; and a central computer configured to: determine a sound level of the sound from the plurality of chargers; compare the sound level to a threshold; and when the sound level approaches the threshold, adjust charger settings for at least one of the plurality of chargers.

Example 10 provides a system according to one or more of the preceding and/or following examples, wherein the first autonomous vehicle is coupled to a first charger of the plurality of chargers, and wherein the microphone is further configured to detect first charger sound.

Example 11 provides a system according to one or more of the preceding and/or following examples, wherein the autonomous vehicle further includes an infrared sensor configured to detect a first charger temperature.

Example 12 provides a system according to one or more of the preceding and/or following examples, wherein the central computer is configured to adjust charger settings for the first charger based on the temperature at the first charger.

Example 13 provides a system according to one or more of the preceding and/or following examples, wherein the central computer is configured to adjust charger settings for the first charger to decrease charging rate of the first charger thereby decreasing the temperature at the first charger.

Example 14 provides a system according to one or more of the preceding and/or following examples, wherein the central computer is configured to determine a first charger sound level and adjust charger settings for the first charger to decrease a fan speed of the first charger, thereby decreasing the first charger sound level.

Example 15 provides a system according to one or more of the preceding and/or following examples, wherein the central computer is configured to adjust charger settings to decrease the sound level.

Example 16 provides a system according to one or more of the preceding and/or following examples, wherein the autonomous vehicle is a first autonomous vehicle, and wherein the central computer is configured to route other fleet autonomous vehicles for charging, based at least in part on the sound level.

Example 17 provides a system according to one or more of the preceding and/or following examples, wherein, when the sound level approaches the threshold, the central computer is configured to route other fleet autonomous vehicles to a different electric vehicle charging site.

Example 18 provides a system for monitoring noise at an electric vehicle charging site, comprising: an autonomous vehicle including a microphone configured to: detect sound from a plurality of chargers at the electric vehicle charging site; and determine a sound level of the sound from the plurality of chargers; a first charger of the plurality of chargers, coupled to the autonomous vehicle, and configured to: receive the sound level from the autonomous vehicle; compare the sound level to a threshold; and when the sound level approaches the threshold, adjust settings to decrease the sound level.

Example 19 provides a system according to one or more of the preceding and/or following examples, wherein, when the sound level approaches the threshold, the first charger is further configured to decrease first charger charging rate thereby decreasing first charger temperature and decreasing first charger fan duty cycle.

Example 20 provides a system according to one or more of the preceding and/or following examples, wherein the autonomous vehicle is a first autonomous vehicle, and further comprising a central computer configured to receive the sound level from the first autonomous vehicle and route other fleet autonomous vehicles for charging based at least in part on the sound level.

Example 21 provides a system according to one or more of the preceding and/or following examples, wherein the first autonomous vehicle is further configured to detect first charger sound and determine first charger sound level.

Example 22 provides a system according to one or more of the preceding and/or following examples, wherein the central computer is configured to determine a first charger sound level and adjust first charger settings based on the first charger sound level.

Example 23 provides a system or method according to one or more of the preceding and/or following examples wherein the threshold is based in part on noise levels at other charging sites.

Example 24 provides a system or method according to one or more of the preceding and/or following examples wherein the central computer is configured to determine a plurality of sound levels at different areas within the charging site and identify a parking spot and corresponding charger at the charging site for a next autonomous vehicle based on the plurality of sound levels.

Example 25 provides a system or method according to one or more of the preceding and/or following examples wherein the fan speed is a first fan speed for a first fan, and wherein adjusting charger settings includes decreasing a second fan speed for a second fan of the first charger, thereby decreasing a first charger sound level.

Example 26 provides a system or method according to one or more of the preceding and/or following examples wherein the first fan speed is different from the second fan speed.

Example 27 provides a system or method according to one or more of the preceding and/or following examples wherein the charger includes a plurality of fans, and wherein adjusting charger settings includes adjusting fan speeds for respective ones of the plurality of fans.

Example 28 provides a system or method according to one or more of the preceding and/or following examples wherein at least two of the plurality of fans have a different respective fan speed.

VARIATIONS AND IMPLEMENTATIONS

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for monitoring noise at an electric vehicle charging site, comprising:
   detecting sound from a plurality of chargers at the electric vehicle charging site at an autonomous vehicle microphone;
   determining a sound level of the sound from the plurality of chargers;
   comparing the sound level to a threshold; and
   when the sound level approaches the threshold, adjusting charger settings for at least one of the plurality of chargers.

2. The method of claim 1, further comprising coupling an autonomous vehicle to a first charger of the plurality of chargers, wherein the autonomous vehicle includes the autonomous vehicle microphone.

3. The method of claim 2, further comprising detecting a temperature at the first charger using infrared sensors on the autonomous vehicle.

4. The method of claim 3, wherein adjusting charger settings includes adjusting charger settings to decrease charging rate of the first charger thereby decreasing the temperature at the first charger.

5. The method of claim 4, wherein adjusting charger settings includes decreasing a fan speed of the first charger, thereby decreasing a first charger sound level.

6. The method of claim 1, wherein adjusting charger settings includes adjusting charger settings to decrease the sound level.

7. The method of claim 1, further comprising communicating the sound level with a central computer configured to route autonomous vehicles for charging.

8. The method of claim 7, further comprising, when the sound level approaches the threshold, routing autonomous vehicles to a different electric vehicle charging site.

9. A system for monitoring noise at an electric vehicle charging site, comprising:

an autonomous vehicle including a microphone configured to detect sound from a plurality of chargers at the electric vehicle charging site; and a central computer configured to:
- determine a sound level of the sound from the plurality of chargers;
- compare the sound level to a threshold; and
- when the sound level approaches the threshold, adjust charger settings for at least one of the plurality of chargers.

10. The system of claim 9, wherein the first autonomous vehicle is coupled to a first charger of the plurality of chargers, and wherein the microphone is further configured to detect first charger sound.

11. The system of claim 10, wherein the autonomous vehicle further includes an infrared sensor configured to detect a first charger temperature.

12. The system of claim 11, wherein the central computer is configured to adjust charger settings for the first charger based on the temperature at the first charger.

13. The system of claim 12, wherein the central computer is configured to adjust charger settings for the first charger to decrease charging rate of the first charger thereby decreasing the temperature at the first charger.

14. The system of claim 12, wherein the central computer is configured to determine a first charger sound level and adjust charger settings for the first charger to decrease a fan speed of the first charger, thereby decreasing the first charger sound level.

15. The system of claim 9, wherein the central computer is configured to adjust charger settings to decrease the sound level.

16. The system of claim 9, wherein the autonomous vehicle is a first autonomous vehicle, and wherein the central computer is configured to route other fleet autonomous vehicles for charging, based at least in part on the sound level.

17. The system of claim 16, wherein, when the sound level approaches the threshold, the central computer is configured to route other fleet autonomous vehicles to a different electric vehicle charging site.

18. A system for monitoring noise at an electric vehicle charging site, comprising:
- an autonomous vehicle including a microphone configured to:
  - detect sound from a plurality of chargers at the electric vehicle charging site; and
  - determine a sound level of the sound from the plurality of chargers;
- a first charger of the plurality of chargers, coupled to the autonomous vehicle, and configured to:
  - receive the sound level from the autonomous vehicle;
  - compare the sound level to a threshold; and
  - when the sound level approaches the threshold, adjust settings to decrease the sound level.

19. The system of claim 18, wherein, when the sound level approaches the threshold, the first charger is further configured to decrease first charger charging rate thereby decreasing first charger temperature and decreasing first charger fan duty cycle.

20. The system of claim 18, wherein the autonomous vehicle is a first autonomous vehicle, and further comprising a central computer configured to receive the sound level from the first autonomous vehicle and route other fleet autonomous vehicles for charging based at least in part on the sound level.

* * * * *